United States Patent

[11] 3,569,845

[72] Inventor Richard Steinberg
Woodland Hills, Calif.
[21] Appl. No. 613,614
[22] Filed Feb. 2, 1967
[45] Patented Mar. 9, 1971
[73] Assignee TRW Inc.
Redondo Beach, Calif.

[54] WIDE BAND FREQUENCY DISCRIMINATOR UTILIZING A CONSTANT AMPLITUDE EQUALIZER NETWORK
5 Claims, 6 Drawing Figs.

[52] U.S. Cl. .......... 329/110, 307/233, 325/344, 325/445, 328/109, 328/155, 329/50, 329/103, 329/131, 333/28
[51] Int. Cl. .......... H03d 3/00
[50] Field of Search .......... 329/50, 110, 131—134, 103, 102; 328/155, 109, 110, 133; 325/435, 445, 449, 344; 307/233; 333/28

[56] References Cited

UNITED STATES PATENTS 2,236,134 3/1941 Gloess .......... 333/28(UX)
2,776,410 1/1957 Guanella .......... 333/28
2,883,536 4/1959 Salisbury et al. .......... 328/155
3,122,716 2/1964 Whang .......... 333/28
3,147,444 9/1964 Ehrich .......... 328/133X

*Primary Examiner*—Alfred L. Brody
*Attorneys*—Daniel T. Anderson, Gerald Singer and Alfons Valukonis

ABSTRACT: A wide band frequency discriminator is disclosed wherein the signal whose frequency is to be detected is applied simultaneously to two parallel paths. One path leads directly into one input of a wide band phase detector, such as a diode switch circuit, and the other path leads through an all pass equalizer network to the other input of the phase detector. The all pass equalizer network is designed to provide a transfer function which shifts the phase of the input signal as a preselected function of the signal frequency but whose amplitude characteristic is independent of signal frequencies. Since the output of the all pass network is compared in phase to the original signal by the phase detector, its output is a direct current voltage the amplitude of which is a measure of the phase difference introduced by the equalizer network which is in turn a known function of signal frequency.

INVENTOR.
RICHARD STEINBERG
BY
Donald C Kearney
ATTORNEY

INVENTOR.
RICHARD STEINBERG
BY
Donald C Kearney
ATTORNEY

INVENTOR.
RICHARD STEINBERG
BY
Donald C Kearney
ATTORNEY

WIDE BAND FREQUENCY DISCRIMINATOR UTILIZING A CONSTANT AMPLITUDE EQUALIZER NETWORK

BACKGROUND OF THE INVENTION

The field of art to which the invention relates is that of frequency discriminator circuits which provide a DC output voltage which is a measure of the frequency modulation or deviation of an input signal from a given carrier frequency. Such circuits are described in general, for example, in a book entitled "Radio Engineers'Handbook" by Frederick E. Terman, the first edition of which was published by McGraw Hill Book Company of New York in 1943. Paragraph 18 of chapter 7, pages 585 through 588, describes the general process of the detection of frequency and phase modulated signals. In particular, on page 588 the author describes the method of demodulation which consists in passing a portion of the frequency modulated wave through a delay line and then combining this delayed wave with a portion of the undelayed wave so that with constant delay time the phase shift will be different for the different side band frequencies and when the delayed and undelayed currents are combined they will add in a manner that depends on frequency.

The fact that this prior art method used a delay line necessarily having a linear transfer function passing through the 0–0 point of the graph of phase shift versus signal frequency, and the fact that the delayed and undelayed signals are added to give an output indication introduces severe design limitations on this technique so that it has not been acceptable for extensive use.

On the other hand, frequency discriminators that are conventionally used in FM radio receivers or c.w. Doppler tracking radars are narrow band, that is, the frequency deviation of the signal is a small portion of the carrier frequency. Hence, tuned high Q circuit elements such as used in the "-Foster-Seely" FM discriminator, the "stagger-tuned" discriminator, or the "slope-detector" discriminator can be employed. However, none of the above circuits are adequate for handling wide band signals, that is, signals whose deviation can be a large portion of the carrier frequency as is the case of interest in the present invention.

Another drawback to the use of the class of frequency discriminators depending upon the use of high Q tuned circuits is the fact that the signal to noise ratio is not maintained constant throughout the band pass with change of signal frequency. For instance, the slope detector makes use of the skirt characteristics of a resonant circuit. Signals whose frequencies are above the carrier frequency are amplified more than signals whose frequencies are below the carrier. Thus, for a constant input noise level, the signal having a frequency above that of the carrier has a better signal to noise ratio than a frequency below the carrier.

A wide band discriminator has been achieved by the prior art by squaring the signal waveform, differentiating the squared waveform, and rectifying the resultant signal. The rectified DC output voltage is necessarily directly proportional to the signal frequency. Furthermore, in order to center the discriminator DC output voltage about the carrier (zero output voltage for a signal of carrier frequency), a DC reference voltage must be employed. Hence, when no signal is present this type of discriminator indicates falsely the presence of a signal whose frequency is far removed from that of the carrier. In addition, the stability of the discriminator crossover point is poor in this device.

SUMMARY

The combination of a wide band phase detector with an all pass equalizer network positioned in one input path to the detector and means to directly apply the signal to be detected simultaneously to the network and to the other input of the detector affords a wide band frequency discriminator which overcomes the above-noted problems of the prior art. Thus, the device of the present invention provides a means for obtaining a crossover frequency stability for the wide band discriminator equal to that obtainable from a narrow band discriminator and has a zero DC output voltage when no signal is present. Furthermore, depending upon the requirements of system application, the all pass equalizer network, unlike the delay line, need not be designed to have a linear phase characteristic over the entire frequency range of interest. Thus, for a given carrier frequency it is usually desirable to design all pass equalizer network so that the phase characteristic has a very steep slope through the operating point determined by the carrier frequency in order to give greater sensitivity and to thereby increase stability of the system. This design flexibility is not possible in the delay line type of device but is readily achieved in the present invention where phase equalizers of the general type described, for example, on pages 248 and 249 of the above-noted Terman handbook are used. Furthermore, where the phase equalizer is a lattice network formed from crystals, not only does one obtain design flexibility, but also one obtains a discriminator having zero output at carrier frequency and a very stable and sharp crossover frequency characteristic. The stability of the crystals can, if necessary, be assured by placing them in controlled ovens.

These and other objects and advantages may be achieved by the device described herein and illustrated in exemplary detail in the drawings.

PREFERRED EMBODIMENT

Figure 1:
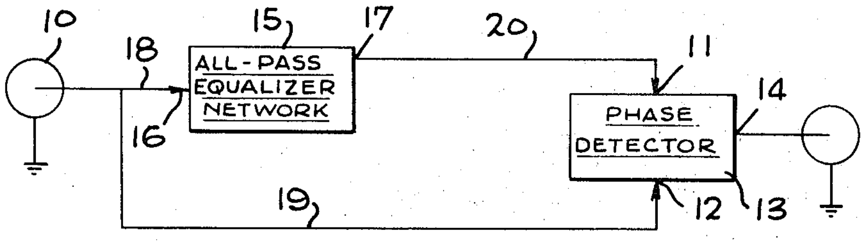
FIG. 1 is a block diagram illustrating the basic circuitry of the wide band discriminator.

Turning now to the drawing, and in particular to FIG. 1 thereof, there is shown a block diagram of a frequency discriminator stage in accordance with the present invention. A source 10 of frequency modulated signal is connected through two parallel paths to the first and second inputs 11 and 12, respectively, of a phase detector 13 in order to provide a DC output signal at the output terminal 14 of the phase detector. An all pass equalizer network 15 is positioned in the first of these paths and has its input terminal 16 connected by the lead 18 to the signal source 10 and its output terminal 17 connected by the lead 20 to the first input terminal 11 of the phase detector. The signal source 10 is also directly connected by lead 19 to the second input terminal 12 of phase detector 13. The signal from source 10 is thus simultaneously applied to the input terminal 12 of the phase detector and to the input terminal 16 of the all pass equalizer network. The network in turn introduces a phase shift which is a predetermined function of the frequency of the input signal and its output is then applied to the other input terminal 11 of the phase detector for comparison with the unshifted portion of the signal. The amplitude and polarity of the DC output of the phase detector afford a measure of the phase difference between its inputs, hence a measure of the phase shift introduced by the network and thus in turn a measure of the frequency deviation of the input signal from the carrier frequency for which network 15 is designed to produce 90° phase shift to thereby produce zero volts out of the phase detector.

The circuitry of the phase detector 13 may take any of the several conventional forms provided only that the components used therein are each selected to have a frequency response such as to accommodate the wide band frequency characteristics desired for the stage. One suitable phase detector circuit is, for example, shown in FIG. 22–16 on page 483 of a book entitled "Electron-Tube Circuits" by Samuel Seely, published in 1950 by McGraw Hill. The output characteristics of that circuit are shown in FIG. 22–17 on page 485 of that book.

As noted above the all pass equalizer network is of the general type described on pages 248 and 249 of the cited Terman handbook. More detailed analysis of such circuits will be found in a book entitled "Network Analysis and Feedback Amplifier Design" by Hendrick W. Bode, published in 1945 by D. VanNostrand Company. Reference is particularly made to FIG. 11–19 on page 241 of that book and to the text discussion relating to that figure.

Figure 2:
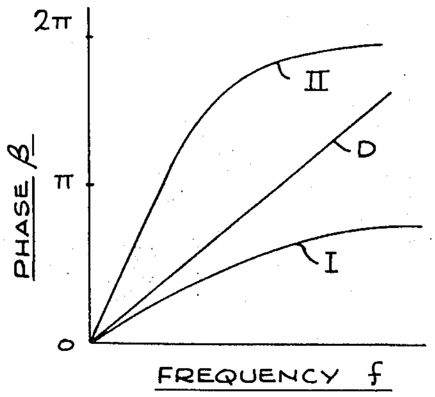
FIG. 2 is a graph showing phase shift as a function of frequency for the transfer characteristics of a typical delay line and of other undesirable networks.
Figure 3:
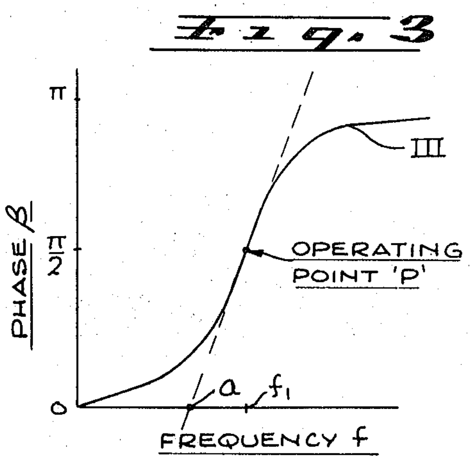
FIG. 3 is a graph similar to FIG. 2 but showing a plot of phase as a function of frequency for the transfer characteristic of the type of all pass equalizer network preferred in the present invention.

Turning now to FIGS. 2 and 3 of the drawings herein, there is shown in FIG. 2 a graph of the relationship between phase shift $\beta$ as a function of frequency $f$ of input signal for various networks which are not desirable for the purposes of the present invention. For example, the line D in FIG. 2 is the typical characteristic of a delay line which affords a linear phase shift characteristic over its entire frequency pass band and which necessarily passes through the origin (0–0) of the Cartesian coordinates of the graph. It will be apparent that if the slope of the line D is increased by adding additional sections to the delay line, the practically usable portion of the line D is shifted lower and lower down the frequency axis in order to accommodate this necessary constraint. For a steep slope in an operating region at higher frequencies, far too many sections are required to be practical.

The curves I and II in FIG. 11.19 of the above-noted Bode book. Bode points out that curve I corresponds to a "single element" section of the type shown in his FIG. 11.11. He further notes that with only one element in the series branch of the lattice, sections of this type have only one design parameter, and this is consumed in fixing the unit of frequency. On the other hand, in two element sections the unit of frequency can be regarded as being established by the resonances of the lattice branches. This leaves one parameter which can be employed to control the shape of the curve. The additional parameter can be taken as the relative stiffness of the antiresonant branch impedance, or as the phase angle of the complex roots and poles of the transfer function. If the antiresonant circuit is relatively stiff the phase characteristic will be nearly equal to twice the phase characteristic of some single element structure and may be of the type shown by curve II in Bode's FIG. 11.19 and reproduced as curve II of FIG. 2 herein.

On the other hand, an antiresonant circuit of low stiffness is demonstrated by Bode to have a phase characteristic of the type shown in curve III of FIG. 3 herein which is of the same general shape and type as curve III in FIG. 11.19 of Bode. The design criteria and techniques for achieving a practical realization of such a network for any particular system and operating frequency are fully set forth by Bode.

It will be noted from FIG. 3 that the curve III is nonlinear and has a central approximately linear portion, the slope for which is quite steep. The teaching of the present invention is to use such a network in the system shown in FIG. 1 wherein the operating point on curve III is selected to provide a 90° or $\pi/2$ phase shift for the carrier frequency $f_1$ of the system. Such a point on the curve is of course located by projecting to the curve from the relevant points on the axes in the usual manner and determining the intersection point which is labeled in FIG. 3 as the operating point P. The network is of course so designed that the steep approximately linear portion of curve III passes through this desired point.

More precisely it is pointed out if a tangent line such as the dashed line in FIG. 3 is drawn to curve III at the operating point it will intersect the frequency axis at some point $a$ which is not identical with the origin or 0–0 point. That is to say, networks characterized by curves of this class do not have the design constraints illustrated by the curves in FIG. 2. As is well known, the equation for any straight line is of the form of the equation for the tangent line which here is shown as $\beta = m (f-aaq)$.

As noted, $\beta$ is the phase shift introduced by the network, $a$ is the intercept on the frequency axis, $m$ is the slope of the tangent dashed line, and $f$ is the frequency of the input signal. In a network of the type suitable for the system discussed herein, $m$, the slope of the tangent at the operating point should typically be greater than one indicating a curve slope of more than 45° This of course indicates a network providing a greater change in phase shift for incremental frequencies around the operating point. This in turn implies greater sensitivity and stability of the system. Furthermore, it is necessary to be able to achieve this increased slope at any desired frequency $f_1$ and in practice this implies that the frequency intercept $a$ should not be a fixed design constraint but rather should have any desired value and be determinable independently of the value of $m$. This design flexibility is possible with an all pass equalizer network but is not possible in systems using a delay line.

This design flexibility is of considerable importance in such systems, for example, as an extended range altimeter which requires apparatus to frequency track the spread spectrum return of a Doppler radar signal reflected by distant objects such as the surface of the moon. A discriminator of the type described herein would be included in the phase-lock acquisition loop of such a system. The function of this circuitry generally is to enable the phase tracking loop to acquire the injected reference offset over the entire range of possible frequency error which in one particular system was plus or minus 11 kilocycles from a nominal carrier frequency of 38 kilocycles.

Figure 4:
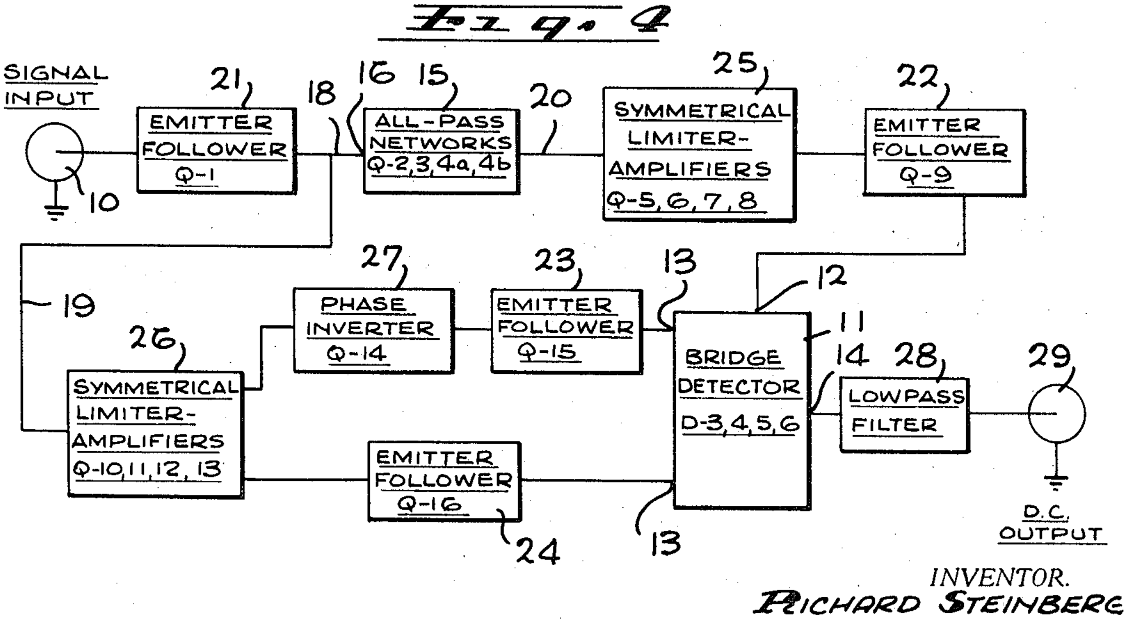
FIG. 4 is a detailed block diagram of a particular exemplary embodiment of the discriminator designed for a particular system application.
Figure 5:
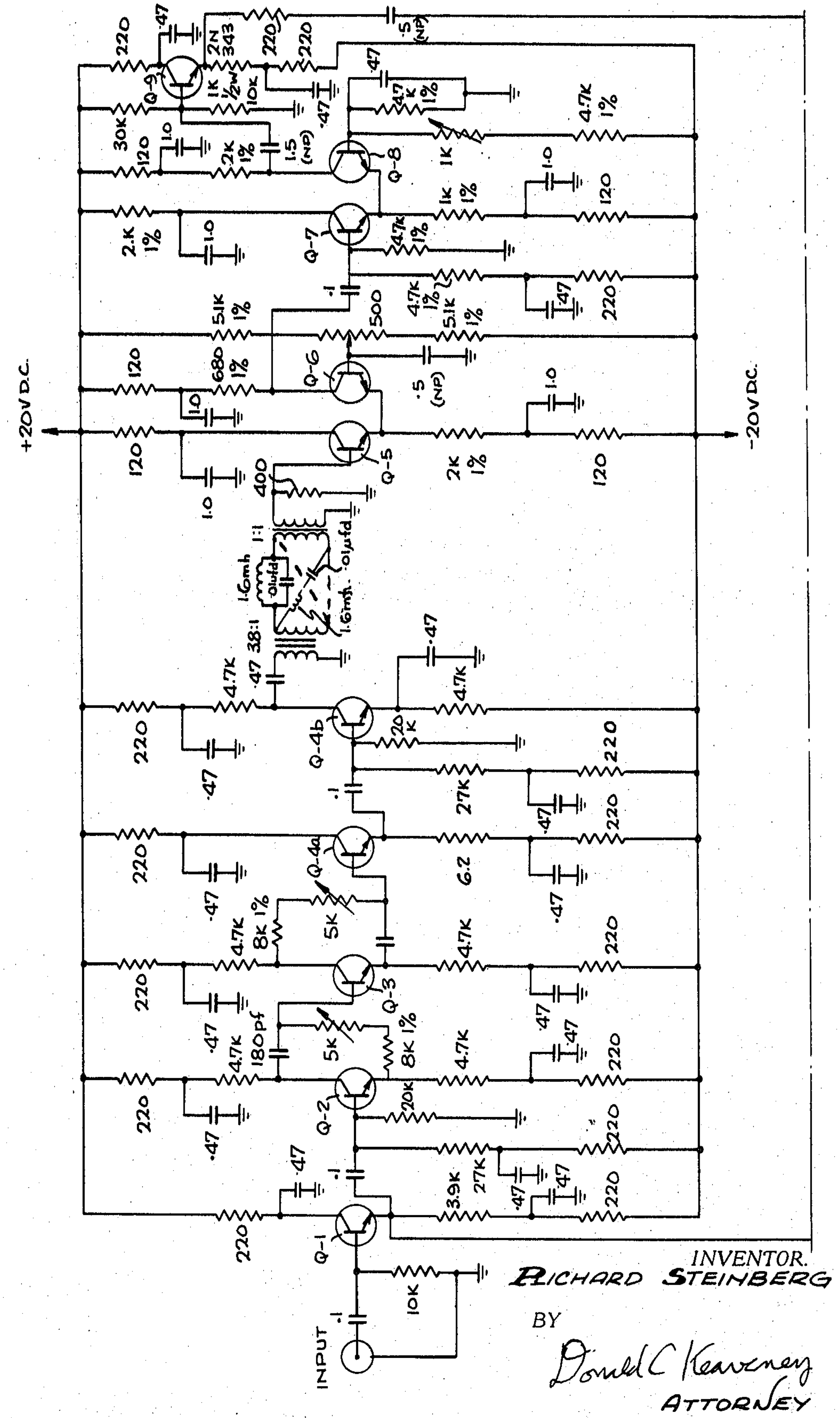
FIGS. 5 and 6 comprise a circuit diagram of the exemplary apparatus shown in the block diagram of FIG. 4. For convenience of presentation the circuit is divided at the break line so that FIGS. 5 and 6 may be shown on two separate sheets of the drawing.
Figure 6:
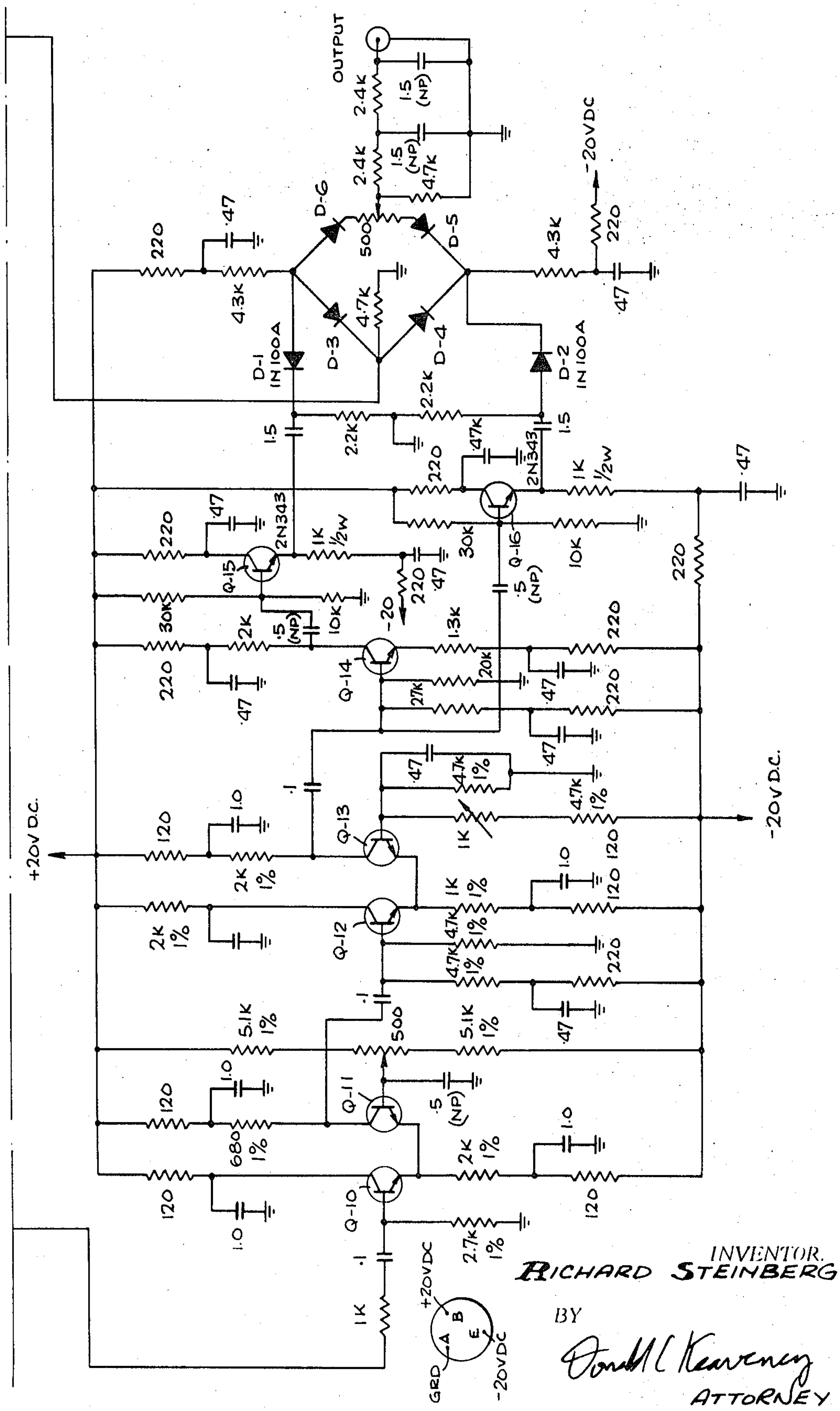

Detailed circuitry suitable for such a system application is shown in the block diagram of FIG. 4 and in the circuit diagram of FIG. 5. It will be understood that this specific system is shown by way of example only and is not intended to limit the scope of the claims. All of the circuit elements which have been described in FIG. 1 and which can be implemented in the various conventional forms referred to above are shown in the more specific block diagram of FIG. 4. Such elements as have already been described in connection with FIG. 1 are identified by the corresponding reference characters in FIG. 4 and will not be further described at this point.

In FIG. 4 there is added to the system of FIG. 1 emitter follower stage 21 connected between the input signal source 10 and the equalizer network 15. Similar emitter follower stages 22, 23, and 24 are connected to input terminals of the bridge-type detector which is shown in this embodiment. All of these emitter follower stages have their usual function of impedance matching and buffering for system stability. It will also be noted that symmetrical limiter amplifiers 25 and 26 are connected in the two paths to the detector, respectively. These limiter amplifiers also have the well known function in FM discriminators of eliminating an residual amplitude modulation. In the system of FIG. 4 it will also be noted that the unshifted portion of the signal is again split into two paths in one of which a phase inverter 27 is connected. This is done only to accommodate the bridge-type detector 12 which, as will be seen below, is used in this system and requires this type of push-pull signal input for operation of the bridge. In principle, however, that is, with respect to phase measurement relations, the system still uses basically only two signal paths. Finally, the system of FIG. 4 includes a low pass filter 28 in the output from bridge detector 12 which is connected to output terminal 29 so that signal may be taken across ground from this terminal. The low pass filter serves merely to eliminate any residual AC signal.

In the circuit diagram of FIG. 5 the transistors Q–1 through Q–16 and their associated circuit elements are respectively connected as shown to carry out the stage functions indicated in the block legends of FIG. 4 in which the respective transistor identification characters are placed. Thus, transistor Q–1 and its associated circuit elements from the emitter follower 21 of FIG. 4. Transistors Q–2, Q–3, Q–4*a* and Q–4*b* are connected as shown in FIG. 5 with their associated circuit elements to form the all pass equalizer network 15 of FIG. 4. Similarly, symmetrical limiter amplifier 25 comprises transistors Q–5, Q–6, Q–7, and Q–8 with associated circuit elements; symmetrical limiter amplifier 26 comprises transistors Q–10, Q–11, Q–12, and Q–13: phase inverter 27 comprises transistor Q–14; emitter follower 22 comprises transistor Q–9; emitter follower 23 comprises transistor Q–15; and emitter follower 24 comprises transistor Q–16. All of the transistors are type 2N338 and the other circuit components have the values indicated in the drawing and are connected as shown. Unless otherwise indicated, resistor values are stated in ohms and it has been found that one quarter watt 5 percent resistors are satisfactory. Similarly, capacitor values are normally stated in microfarads.

The phase detector circuit shown in this system utilizes four type FA–4000 diodes connected in a bridge circuit as shown in FIG. 5, these being indicated in both FIGS. 4 and 5 as diodes D3, D4, D5, and D6.

Each of the stages of the system shown in FIGS. 4 and 5 functions in accordance with the principles discussed above and since this specific preferred embodiment is merely one of many possible embodiments of the invention, it is not deemed necessary to further trace the specific circuit operation.

It is noted, however, that in FIG. 5 the lattice network between transistors 0–4b and 0–5 is shown using dashed lines for two of the four symmetric arms of the lattice connected between the transformers as is customary in the literature. It will, of course, be understood that the dashed line indicates an arm having components the same as those of the symmetrically positioned arm shown in full line and is used only to simplify the drawing.

I claim:

1. A wide band frequency discriminator comprising:
A. a wide band phase detector having first and second input terminals and an output terminal;
B. an all pass equalizer network having input and output terminals and having a transfer function such that the output signal from the network has its phase shifted as a predetermined linear function of the frequency of the input signal to the network over a limited range and as a nonlinear function over an extended frequency range;
C. means connecting the output terminal of said network to the first input terminal of said phase detector; and
D. means to apply a frequency modulated signal simultaneously to the input terminal of said network and directly to the second input terminal of said phase detector.

2. A wide band frequency discriminator comprising:
A. a wide band phase detector having first and second input terminals and an output terminal;
B. an all pass lattice equalizer network having input and output terminals and having a transfer function such that the output signal from the network has its phase shifted as a predetermined linear function of the frequency of the input signal to the network over a preselected frequency range;
C. means connecting the output terminal of said network to the first input terminal of said phase detector; and
D. means to apply a frequency modulated signal simultaneously to the input terminal of said network and directly to the second input terminal of said phase detector.

3. Apparatus for producing a DC voltage which is a measure of the deviation of the frequency of an input signal from a preselected carrier frequency comprising:
A. an all pass equalizer network having input and output terminals;
B. means to apply a frequency modulated signal to said input terminal;
C. impedance elements in said network selected to produce a network transfer function such that the network produces a 90° phase shift in its output signal when the frequency of said input signal is equal to said carrier frequency, and produces a phase shift less than or greater than 90° according to whether the frequency of said input signal is less than or greater than said carrier frequency as a linear function;
D. a wide band phase detector circuit which has first and second input terminals and an output terminal for producing a DC output voltage of one polarity when the phase difference between its inputs is less than 90°, an output of the opposite polarity when said phase difference is greater than 90°, and an output of zero amplitude when said phase difference is equal to 90°;
E. means to apply the output signal from said network to the first input terminal of said phase detector; and
F. means to apply a portion of said frequency modulated signal applied to said input of the network directly to said second input terminal of said phase detector.

4. A wide band frequency discriminator comprising:
A. a wide band phase detector having first and second input terminals and output terminals;
B. on all pass equalizer network having input and output terminals and having a transfer function such that the output signal from the network has its phase shifted as an approximately linear function of the frequency of the input signal to the network at least over a preselected frequency range, said transfer function being such that the tangent to the curve expressing the value of phase shift $\beta$ as a function of frequency $f$ at a predetermined point on the curve in said approximately linear portion is defined by the equation $\beta = m(f-a)$ wherein the absolute value of $a$ is greater than zero and wherein the value of $m$ can be predetermined independently of the value of $a$;
C. means connecting the output terminal of said network to the first input terminal of said phase detector; and
D. means to apply a frequency modulated signal simultaneously to the input terminal of said network and directly to the second input terminal of said phase detector.

5. A wide band frequency discriminator comprising:
A. a wide band phase detector having first and second input terminals and an output terminal, said phase detector having a zero output when a phase difference of 90° exists between signal applied to said input terminals;
B. an all pass equalizer network having input and output terminals and composed of elements which provide a network transfer function such that the output signal from the network has its phase shifted as a predetermined function of the frequency of the input signal to the network over a preselected frequency range, said predetermined function being such that the tangent to the curve expressing the value of phase shift $\beta$ as a function of frequency $f$ at a preselected operating point on the curve corresponding to a frequency $f_1$ is defined by the equation $\beta = m(f-a)$ wherein the absolute value of $a$ is greater than zero and wherein the value of $m$ is greater than one and can be predetermined independently of the value of $a$, said phase shift $\beta$ having a value of 90° at said frequency $f_1$;
C. means connecting the output terminal of said network to the first input terminal of said phase detector; and
D. means to apply a frequency modulated input signal simultaneously to the input terminal of said network and directly to the second input terminal of said phase detector to produce a DC output voltage from said phase detector which is proportional to the deviation of the frequency of said input signal from said frequency $f_1$ at said operating point within a preselected range of deviation.